United States Patent [19]

Raftis

[11] Patent Number: 4,763,527
[45] Date of Patent: Aug. 16, 1988

[54] TEMPERATURE-RESISTANT ISOLATION FLUID PRESSURE DETECTOR

[75] Inventor: Spiros G. Raftis, Pittsburgh, Pa.

[73] Assignee: Red Valve Co., Inc., Carnegie, Pa.

[21] Appl. No.: 6,125

[22] Filed: Jan. 23, 1987

[51] Int. Cl.$^4$ .............................................. G01L 7/02
[52] U.S. Cl. ........................................ 73/730; 73/708
[58] Field of Search ...................... 73/730, 119 A, 708

[56] References Cited

U.S. PATENT DOCUMENTS

| | | | |
|---|---|---|---|
| 2,274,479 | 2/1942 | Inderdohnen et al. | 73/730 |
| 3,130,586 | 4/1964 | Taylor et al. | 73/730 |
| 3,563,095 | 2/1971 | Robinson, Jr. | 73/730 |
| 4,218,926 | 8/1980 | DeVisser | 73/730 |

Primary Examiner—Donald O. Woodiel
Attorney, Agent, or Firm—Kirschstein, Kirschstein, Ottinger & Israel

[57] ABSTRACT

A tubular metal sleeve having two annular welding end collars and a flexible intermediate sleeve portion between the collars is mounted in a bore of a housing. The sleeve permits passage of high temperature pressurized fluids impervious to the sleeve. The sleeve forms part of a gauge for detecting the pressure of the fluid. A spacer may be mounted in a space formed between the sleeve and the housing to reduce the quantity of pressure-transmitting liquid required to fill the space.

4 Claims, 2 Drawing Sheets

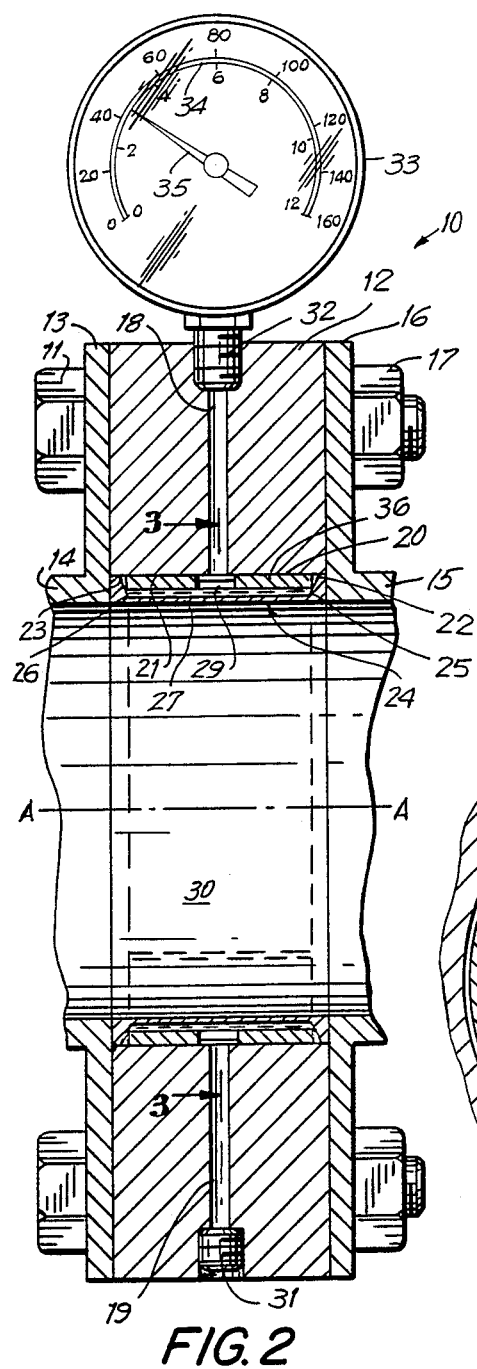
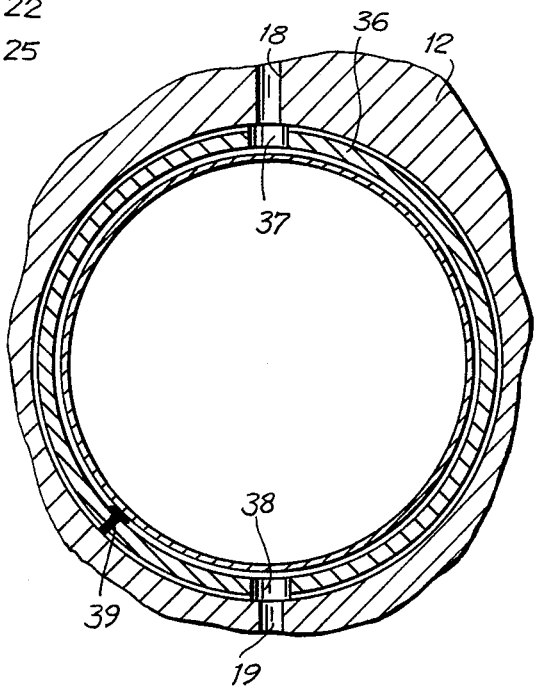
FIG. 2
FIG. 3

TEMPERATURE-RESISTANT ISOLATION FLUID PRESSURE DETECTOR

BACKGROUND OF THE INVENTION

1. Field of the Invention

This invention generally relates to fluid pressure detecting or measuring arrangements of the type in which the fluid whose pressure is being measured is isolated from a pressure-detecting mechanism or gauge and, more particularly, to a temperature-resistant arrangement for measuring the pressure of fluid at elevated temperatures, e.g. above 285° F.

2. Description of Related Art

There are already known various constructions of fluid pressure-detecting or measuring arrangements, among them such in which a flexible elastomeric rubber sleeve isolates or separates a test fluid whose pressure is to be detected from a pressure-detecting mechanism or gauge proper, and wherein a pressure-transmitting fluid is used to transmit the pressure which acts on the rubber sleeve to the gauge. For example, in U.S. Pat. No. 4,534,224 a generally annular housing is interposed between two flanges of a pipe line and connected thereto. An annular flexible rubber sleeve is received in a longitudinal bore of the housing. This sleeve bounds a confining space with the bore, the confining space being filled with a pressure-transmitting fluid, as is a gauge which is in communication with the confining space through a mounting portion thereof which is sealingly received in a port of the housing that opens into the bore.

This known arrangement works quite satisfactorily in many instances in that the pressure of the test fluid that is to be detected acts on the rubber sleeve and flexes the same accordingly, thereby displacing a corresponding amount of the pressure-transmitting fluid out of the confining space and into the gauge which is thus subjected to a pressure corresponding to that to be detected, and thus indicates the same with an accuracy which is determined solely by the construction of the gauge. Moreover, since the inner diameter of the rubber sleeve corresponds to that of the pipe line, there is a smooth transition between the pipe line and the rubber sleeve, thus avoiding corners in the flow path where ingredients of the test fluid could deposit with deleterious effects on the performance of the arrangement. Also, the rubber sleeve separates the test fluid from the gauge, thus protecting the latter, for instance, from attack or clogging by such test fluid. Furthermore, since the rubber sleeve flexes during the use of the arrangement, any deposits or encrustations which may develop thereon are broken up and disassociated from the rubber sleeve, thus not interfering with the flexing of the latter.

However, experience with the arrangement described above has shown that, as advantageous as it may be in many respects, the rubber sleeve tends to become tacky when the test fluid is at an elevated temperature on the order of 285° F. and above. In some applications, for example, the food industry, there is a requirement to steam out and clean the pipe line after a food slurry has been conveyed therethrough. Steaming above 285° F. will adversely affect the rubber sleeve. Also, it has been observed that elevated temperatures will cause the pressure-transmitting fluid to expand outwardly of its confining space, thereby leading to erroneous pressure readings. Hence, there is a temperature limitation on the prior art arrangements employing rubber sleeves as a flexing element.

SUMMARY OF THE INVENTION

1. Objects of the Invention

It is a general object of this invention to avoid the drawbacks of the prior art.

It is another object of this invention to provide an isolation pressure-detecting temperature-resistant arrangement which does not possess the disadvantages of the conventional arrangements of this kind.

Still another object of this invention is to so construct the arrangement as to avoid the possibility that the temperature of the test fluid being measured will affect the pressure measurement.

A further object of this invention is to so design the arrangement as to prevent the possibility that the temperature of the test fluid being measured could tackify the sleeve, expand the pressure-transmitting fluid or otherwise interfere with the accuracy of the measurement.

Yet another object of this invention is to devise a pressure-detecting temperature-resistant arrangement of the isolation type which is relatively simple in construction, inexpensive to manufacture, easy to install and use, and reliable in operation, nevertheless.

2. Features of the Invention

In keeping with these objects, and others which will become apparent hereinafter, one feature of this invention resides, briefly stated, in a temperature-resistant arrangement for detecting the pressure of a test fluid at an elevated temperature. The arrangement comprises a tubular metal housing having an internal circumferential surface bounding an elongated cylindrical bore centered on a longitudinal axis. The bore has opposite internal axial end regions and an internal predetermined diameter.

A tubular metal sleeve is mounted in the bore, and bounds an axially-extending internal passage through which a pressurized test fluid at an elevated temperature flows in a temperature-impervious relationship. Put another way, the elevated temperature does not tackify the metal sleeve. The metal sleeve extends axially along the entire length of the bore. The metal sleeve has two annular welding end collars, and a flexible intermediate cylindrical sleeve portion between the welding end collars. The flexible sleeve portion has an outside diameter less than said internal predetermined diameter of the bore, and bounds therewith a circumferential space. The flexible sleeve portion is constituted of a thin, e.g. less than 0.01" in thickness, resilient, metallic material, e.g. stainless steel, capable of flexing and returning to an unflexed state. Each welding end collar has an outer diameter substantially equal to said internal predetermined diameter of the bore. Each collar has an axial dimension sufficient to enable the respective welding end collar to be welded to a respective internal end region of the bore, thereby sealing the space from the passage.

The arrangement further comprises a port in the housing. The port extends from, and is in fluid communication with, the space. The port leads to the exterior of the housing.

A pressure gauge having a mounting portion is sealingly mounted in the port. A pressure-detecting mechanism of the gauge is in fluid communication with the space through the port.

A quantity of pressure-transmitting fluid fills the space, the port and the pressure gauge to transmit to the pressure-detecting mechanism the pressure of the test fluid present in the passage, as applied to the pressure-transmitting fluid, through the flexible sleeve portion with attendant flexing thereof.

A particular advantage of the arrangement as described thus far is that, since the sleeve is made of metal instead of rubber, elevated temperatures of the test fluid will not cause the sleeve to tackify, thereby permitting the arrangement to be used in many applications previously foreclosed. The invention can be used not only in the food and chemical industries where pipe lines are frequently steamed out, but also in the textile industry, as well as a host of other industries where it is imperative to detect pressure of a fluid at high temperatures.

It was previously thought to be impossible to fashion the sleeve of metal instead of rubber, due to the conflicting requirements of forming the wall of the sleeve to be very thin, e.g. on the order of 0.003", but, at the same time, to weld the sleeve to the housing. There is simply not enough material or "meat" available in a 0.003" wall to permit welding, since such a thin wall will burn, dissolve and melt away.

However, according to an advantageous aspect of this invention, a thick metal sleeve is positioned over a mandrel, e.g. a rigid tube, and machined so that the aforementioned flexible sleeve portion is machined down to the desired thinness on the order of 0.003". At the same time, the welding end collars are not so machined. In a preferred embodiment, wherein the internal diameter of the metal sleeve is about 4", then it is advantageous if each welding end collar has a radial thickness on the order of $\frac{1}{8}$" and an axial thickness at its widest point to also equal $\frac{1}{8}$". This provides sufficient "meat" to enable each welding end collar to be welded to a respective internal axial end region of the bore.

According to a currently preferred concept of this invention, each collar has a generally planar outer axial end face and a tapered inner face. A spacer is situated within the space, and is located between the tapered inner faces of the collars to reduce the quantity of pressure-transmitting fluid required to fill the space.

As noted above, it has been observed that, at elevated temperatures, the pressure-transmitting fluid tends to expand out of its confining space, thereby leading to false pressure readings. To minimize such errors, the spacer, in effect, occupies a substantial portion of the space and reduces the quantity of pressure-transmitting fluid filling the space. Tests have shown that with less pressure-transmitting fluid in the space, erroneous pressure readings at elevated temperatures are less likely to occur.

In a preferred embodiment, the spacer is formed as a split metallic cylinder which is slid over the sleeve and tacked onto the same to prevent shifting during welding of the end collars to the bore. The cylinder has a hole in alignment with the port and, of course, the tacked spacer prevents the hole from shifting out of alignment with the port.

It is even more advantageous when the arrangement of this invention is incorporated in a pipe line that conveys the test fluid to be measured between two sections of such a pipe line. The housing has two end faces, each of which faces, and is connected to, one of the pipe line sections in use.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 2 is a longitudinal sectional view of the arrangement taken along the line 2—2 of FIG. 1, after the gauge has been mounted on the pipe line;

FIG. 3 is a cross-sectional view taken on the line 3—3 of FIG. 2; and

DETAILED DESCRIPTION OF THE PREFERRED EMBODIMENT

Figure 1:
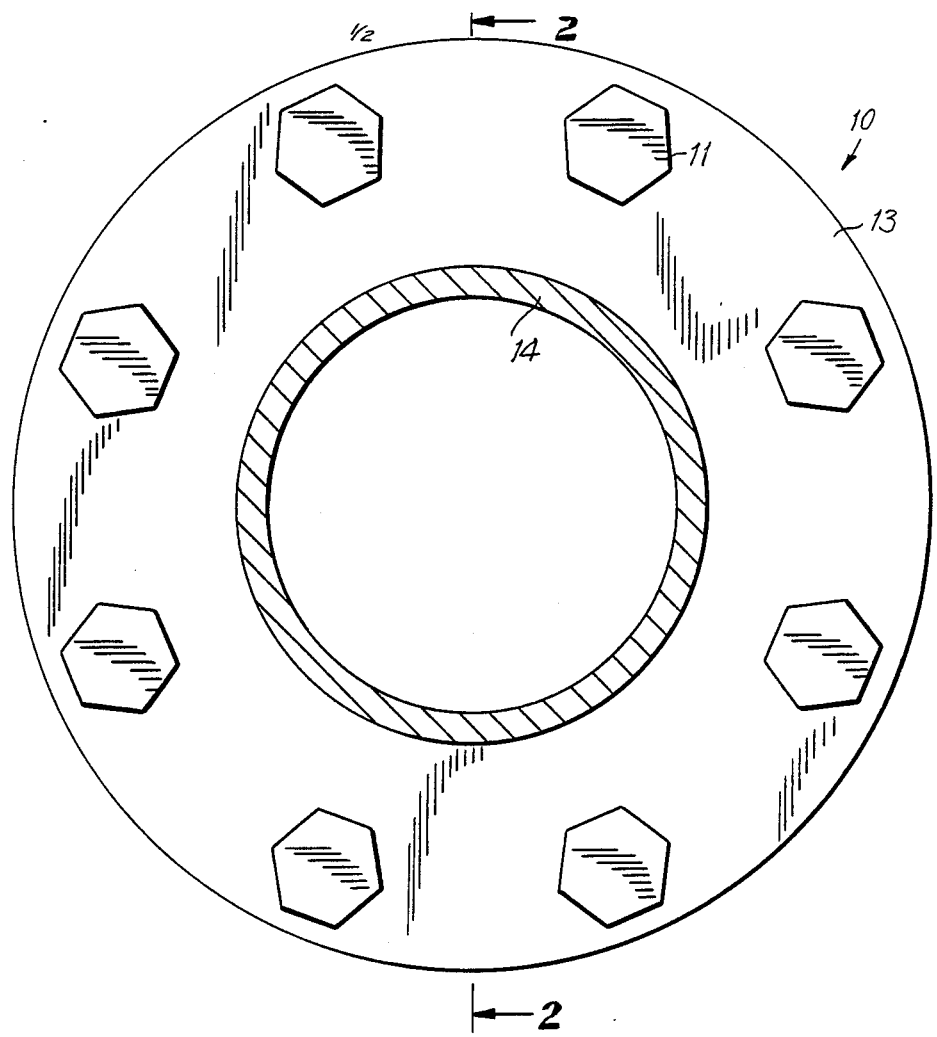
FIG. 1 is an end view of a detecting arrangement according to this invention as incorporated in a pipe line prior to the mounting of a gauge thereon.

Referring now to the drawings in detail, and first to FIGS. 1 and 2 thereof, it may be seen that reference numeral 10 generally identifies a pressure-detecting arrangement of the invention in its entirety. The arrangement 10 includes, as one of its main components, a tubular metal housing 12 which is connected in any conventional manner, but, as shown, by bolts 11 to an annular flange 13 of a pipe section 14. The pipe section 14 may be a part of a receptacle containing the fluid, the pressure of which is to be detected or measured, or, as shown in FIG. 2 in more detail, a part of a pipe line that includes another pipe section 15 having its own annular flange 16. In this case, the housing 12 is connected to flanges 13 and 16 by means of a plurality of equi-angularly arranged threaded bolts 11 which extend through mutually aligned pairs of holes formed in the flanges 13 and 16. A set of nuts 17 threadedly engage the free ends of the bolts 11, and clamp the flanges 13, 16 onto opposite end faces of the housing 12.

The housing 12 is shown in FIG. 2 to include a measuring port 18 as well as a relief port 19. In the position shown in the drawings, which is the preferred position of use of the arrangement 10, the measuring port 18 is situated at the top and the relief port 19 at the bottom of the arrangement 10. Yet, deviations from this orientation are acceptable so long as they do not deleteriously affect the operation of the arrangement 10 or its accuracy.

The tubular metallic housing 12 has an internal circumferential surface 20 which bounds an elongated cylindrical internal bore 21 centered on, and extending along, a longitudinal axis A—A. The bore 21 has opposite internal axial end regions 22, 23, and has an internal predetermined diameter of a size dependent on the particular application.

A tubular metal sleeve 24 is accommodated in the bore 21, and extends axially along the entire length of the bore. The sleeve 24 includes two annular welding end collars 25, 26 which are situated and welded at the respective axial end regions 22, 23 of the bore. The sleeve 24 further includes an intermediate flexible cylindrical sleeve portion 27 which is integral with the end collars 25, 26. The flexible sleeve portion 27 has an outside diameter less than said internal predetermined diameter of the bore 21, and bounds therewith a circumferentially complete space 28. The space 28 extends all the way around the bore 21. The flexible sleeve portion 27 is constituted of a thin, e.g. less than 0.01" and preferably about 0.003", resiliently metallic material, e.g. stainless steel, capable of flexing when subjected to deformation forces, and of returning due to its inherent resilience to an unflexed state which is shown in FIG. 2.

The welding end collars 25, 26 which are welded at the axial end regions of the bore each has an outer diameter substantially equal to the internal predetermined diameter of the bore, and has an axial dimension sufficient to enable a respective collar to be welded to a respective axial end region 22, 23 without burning, melting or dissolving of the respective collar. In other words, each welding collar has sufficient axial and radial dimensions to permit it to be welded to the housing 12 within the bore 21. For example, in the case where the internal diameter of the sleeve 24 is 4", then each collar has a radial cross-sectional dimension of about ⅛" and an axial cross-sectional dimension of about ⅜". These axial and radial dimensions provide sufficient so-called "meat" for welding purposes.

The welding is of such a character that a substantially hermetic sealing action is obtained around the collars about the periphery of the bore at the respective axial end regions of the latter. The aforementioned circumferential space 28 is axially delimited by the respective collars. The space 28 accommodates a body of a pressure-transmitting liquid 29 which completely, or substantially so, fills the space 28. The sealing contact of the collars with the housing 12 prevents the liquid 29 from escaping from the space 28 into the interface between the flanges 13 and 16 of the pipe line sections and the opposite end faces of the housing 12.

The sleeve 24 bounds an internal passage 30 which accommodates the fluid, especially a liquid, the pressure of which is to be measured, the fluid being at an elevated temperature, for instance, above 285° F. As illustrated, the internal circumferential surface bounding the passage 30 has the same diameter as the inner surfaces of the pipe sections 14, 15 so that a smooth, stepless transition is obtained at the interfaces between the sleeve and the respective pipe sections. This assures not only that there are no changes in flowthrough cross-section for the flow of the high temperature pressurized fluid to be measured, or obstructions extending into the path of such flow which could interfere with the flow or cause turbulence therein, but also that there are no dead corners in which the fluid to be measured could come to a standstill or flow at a much reduced speed, thus increasing the possibility of deposition or sedimentation of solid particles or encrustations from the fluid to be measured.

The flexible sleeve portion 27 is made of metal rather than rubber, and is impervious to the elevated temperatures, thereby permitting the flexible sleeve portion to be used in high temperature applications. The sleeve 24 is preferably machined by slipping a cylindrical tube over a rigid tubular mandrel, and by machining the flexible sleeve portion therefrom.

A plug 31 is received in the relief port 19 in a sealing, but removable, manner. As illustrated, the plug 31 has an external thread, while the surface bounding the relief port 19 is provided with an internal thread that meshes with the external thread of the plug 31. When the plug 31 is removed from the port 19, the pressure-transmitting liquid 29 can be drained from the space 28.

The measuring port 18, which is also shown to be provided with an internal thread, receives in a sealing manner an externally-threaded mounting or closing portion 32 of a pressure gauge 33 which is of a conventional construction and has a known internally-arranged pressure-sensing or pressure-detecting mechanism to which the pressure prevailing in the space 28 is applied through a duct provided in the mounting portion 32 by the pressure-transmitting liquid 29. The pressure-detecting mechanism will then give an indication of this pressure. As illustrated, such indication is provided by a pressure dial 34 and a pressure indicator or needle 35 which is connected to the output of the pressure-detecting mechanism for movement therewith.

Figure 4:
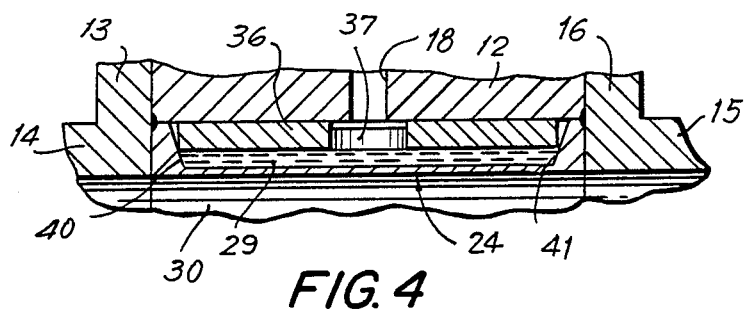
FIG. 4 is an enlarged partly broken-away sectional view of a detail of the arrangement of FIG. 2.

A spacer 36 is situated within the space 28, and located between the collars 25, 26 in order to occupy, and thereby reduce the quantity of pressure-transmitting liquid 29 actually required to fill, the space 28. As shown in FIG. 3, the spacer 36 is a split metallic cylinder having holes 37, 38 which are respectively aligned with ports 18, 19. The split spacer 36 is initially axially slid over and around the flexible sleeve portion 27, and then tack-welded into place at tack-weld 39 to the flexible sleeve portion, but only before the holes 37, 38 have been aligned with ports 18, 19. The tack-weld 39 prevents the spacer 36 from being shifted either circumferentially or axially. The end collars 25, 26 are provided with tapered inner faces 40, 41, as shown in FIG. 4. The spacer 36 is advantageously located between these tapered inner faces which converge toward each other in a radially-inward direction to provide a self-seating capability for the spacer 36.

Having so described the construction of the arrangement of this invention, its operation will now be briefly discussed, and the advantages thereof over the prior art will be pointed out.

After the arrangement 10 is incorporated into the pipe line between the pipe sections 14, 15 thereof, with the end collars 25, 26 welded at opposite axial end regions 22, 23 of the bore 21 and, optionally, with the spacer 36 located within the space 28, high temperature pressurized fluid whose pressure is to be detected or measured is admitted into the interior of the pipe line and, hence, into the passage 30. The space 28 is filled with the pressure-transmitting liquid 29, either prior to such incorporation or thereafter, to fill not only the space 28, but also the interior of the gauge 33. Advantageously, this is accomplished prior to the incorporation by pouring the pressure-transmitting liquid 29 into the space 28 through the relief port 19, with the mounting portion 32 of the gauge 33 closing the port 18, and with the port 19 facing upwardly. Once the plug 31 is threaded into the port 19 following the filling of the space 28 and the gauge with the liquid 29, the introduced quantity of the liquid 29 is confined in the space 28 and in the gauge 33 without possibility of escaping therefrom due to the sealing action of the mounting portion 32, the plug 31 and the collars 25, 26. The spacer 36 occupies a non-negligible volume within the space 28 and, in effect, reduces the quantity of the liquid 29 admitted therein. Once the arrangement 10 is incorporated between the pipe sections 14, 15, the sealing action of the collars prevents the fluid to be measured from escaping from the passage 30 and, thus, from the pipe line. Hence, the two fluids are effectively and efficiently separated.

The pressure of the high temperature fluid present in the passage 30 acts generally radially outwardly on the flexible sleeve portion 27. As far as the end collars 25, 26 are concerned, this merely means that these collars will be more firmly pressed against the surface bounding the bore 21. However, at the region of the flexible sleeve portion 27, this pressure will cause outward deflection of the flexible sleeve portion. This means that the pressure in the space 28 will increase, and the pressure-transmitting liquid 29 will hydraulically transmit such pressure increase to the pressure-measuring mechanism of the gauge 33, thus changing the indication thereof as provided by the needle 35 against the background of the pressure dial 34.

Similarly, when the pressure of the fluid present in the passage 30 goes down from the previously reached level, this pressure reduction will cause a decrease in the extent of flexing of the flexible sleeve portion 27, thus reducing the pressure in the space 28, and also reducing the pressure of the pressure-transmitting liquid 29 and, thus, ultimately the read-out of the gauge 33.

Since the flexible sleeve portion 27 is adjoined by the integral end collars 25, 26 which are welded to axial end regions of the bore 21, no penetration of the fluid present in the passage 30 flows into the space 28 where such penetrating fluid could otherwise interfere with the operation of the flexible sleeve portion 27 and, thus, with the accuracy of the measurement.

It will be understood that if pressure inside a container, rather than in a pipe line, were to be measured, the same arrangement 10 could also be used, in which case, one end portion of the housing would be connected to a tubular portion or nipple of such container, and the other end portion of the housing would be hermetically closed, for instance, by a disc-shaped closure spanning the passage 30 and in sealing contact therewith.

The arrangement 10 is especially suited for use in environments where the fluid, particularly, but not exclusively, liquid, e.g. slurries, whose pressure is to be measured, is a food or pharmaceutical product, and would clog the gauge 33 if not effectively separated tnerefrom, or is to be conveyed in a sanitary manner. However, the invention can also be used in applications different from those specifically mentioned herein, and particularly in high temperature applications such as steam clean-out lines, and the textile industry, where prior art sleeves constituted of rubber or similar elastomeric materials tended to become tacky at such elevated temperatures. The use of a flexible metallic sleeve portion 27, which does not become tacky at such elevated temperatures, overcomes such prior art drawbacks.

It will become apparent that, since the space 28 extends all the way around the bore 21, the flexible sleeve portion 27 will expand in all directions substantially uniformly when uniform pressure acts thereon in all radial directions. However, even if this were not the case, that is, if the radial pressure differed from one location to another along or around the flexible sleeve portion 27, or if some zones of the flexible sleeve portion were less flexible than others, then the accuracy of the measurement would not suffer since other portions of the flexible sleeve portion 27 would make up for the deficiencies or imperfections of the affected regions.

The use of the spacer 36 results in less pressure-transmitting liquid 29 being necessary to fill up the space 28. This is very desirable in high temperature applications wherein the high temperature of the fluid causes the liquid 29 to expand and transmit an erroneous pressure reading to the gauge.

The pressure-detecting arrangement of this invention can be used to detect the pressure of any fluid and, as used herein, the term "fluid" is intended to include slurries and sludges, and particularly those in which solids from the food, pharmaceutical, textile and chemical industries are entrained. In these industries, sanitary conditions are imperative, and such products must be isolated from the gauge, and particularly from the captive pressure-transmitting liquid 29 therein, which liquid is typically mineral oil. Food or pharmaceutical products such as tomato skins, seeds, corn, beans, pharmaceutical powder, drugs, and superheated steam for cleaning out the pipe lines after such products have been conveyed therethrough, which products would otherwise normally clog the gauge 33, are automatically dislodged due to the flexing action of the flexible sleeve portion 27 in a self-cleaning manner. Since the sleeve preferably extends the full length of the bore 21 in the housing 12, this construction eliminates any pockets in the fluid, and particularly the solid particles thereof, in which to lodge. Any decayed products in such pockets can be a source of contamination. There are no internal pockets or dead ends or crevices, thereby resulting in a full, uninterrupted and sanitary flow.

Advantageously, as noted above, the detector of this invention provides for a full 360° circumferential reading, and can be mounted in any flow direction. Any trapped air in the pipe line or local sediment deposits will not change the gauge reading. The relief port 19 also serves as an instrument connection in the event that other equipment or tubing is intended to be connected to the detector.

The use of a metal sleeve was hitherto thought to be impossible due to the conflicting requirements of providing a sleeve which was thin enough to flex repeatedly and to return to its unflexed state, and the requirement to weld the sleeve to a surrounding housing. Welding required the use of a thick sleeve which, of course, could not be used for flexing purposes. However, the use of a machined metal sleeve with integral thickened end collars and a thin flexible sleeve portion between the end collars satisfies the dual requirements for flexibility and welding.

It will be understood that each of the elements described above, or two or more together, also may find a useful application in other types of constructions differing from the types described above.

While the invention has been illustrated and described as embodied in a temperature-resistant isolation fluid pressure detector, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A temperature-resistant arrangement for detecting the pressure of a fluid at an elevated temperature, comprising:
 (A) a tubular metal housing having an internal circumferential surface bounding an elongated cylindrical bore centered on a longitudinal axis, said bore having opposite internal axial end regions and an internal predetermined diameter;

(B) a tubular metal sleeve mounted in the bore and bounding an axially-extending internal passage through which a pressurized fluid at an elevated temperature flows in a temperature-impervious relationship,
- (i) said metal sleeve extending axially along the entire length of the bore and having two annular welding end collars and a flexible, intermediate cylindrical sleeve portion between and integral with the welding end collars,
- (ii) said flexible sleeve portion having an outside diameter less than said internal predetermined diameter of the bore and bounding therewith a circumferential space,
- (iii) said flexible sleeve portion being constructed of a thin, resilient metallic material capable of flexing and returning to an unflexed state,
- (iv) each welding end collar having an outer diameter substantially equal to said internal predetermined diameter of the bore and having an axial dimension sufficient to enable a respective welding end collar to be welded to a respective internal end region of the bore, thereby sealing the space from the passage, and
- (v) each collar having a generally planar outer axial end face and a tapered inner face;

(c) a port in the housing and extending from, and being in fluid communication with, the space, and leading to the exterior of the housing;

(D) a pressure gauge having a mounting portion in the port, and a pressure-detecting mechanism in fluid communication with the space through the port; and (E) a quantity of pressure-transmitting fluid filling the space, the port and the pressure gauge to transmit to the pressure-detecting mechanism the pressure of the fluid present in the passage as applied to the pressure-transmitting fluid through the flexible sleeve portion with attendant flexing thereof.

2. The temperature-resistant arrangement as recited in claim 1; and further comprising a spacer situated within the space and located between the tapered inner faces of the collars to reduce the quantity of pressure-transmitting fluid required to fill the space.

3. The temperature-resistant arrangement as recited in claim 2, wherein the spacer is a split metallic cylinder tacked on the sleeve, said cylinder having a hole for alignment with the port.

4. The temperature-resistant arrangement as recited in claim 1, for incorporation between two sections of a pipe line that conveys the fluid, wherein said housing has two end faces each of which faces one of the pipe line sections in use.

* * * * *